United States Patent [19]

Cooper

[11] 4,316,119
[45] Feb. 16, 1982

[54] TILTED UNITARY DEGAUSSING COIL ARRANGEMENT

[75] Inventor: John C. Cooper, Lititz, Pa.

[73] Assignee: RCA Corporation, New York, N.Y.

[21] Appl. No.: 228,869

[22] Filed: Jan. 27, 1981

Related U.S. Application Data

[63] Continuation of Ser. No. 12,810, Feb. 16, 1979, abandoned.

[51] Int. Cl.³ .............................................. H04N 9/29
[52] U.S. Cl. ....................................... 315/8; 361/150
[58] Field of Search ........................... 315/8; 361/150

[56] References Cited

U.S. PATENT DOCUMENTS

| | | | |
|---|---|---|---|
| 2,921,226 | 1/1960 | Vasilevskis | 315/8 |
| 2,962,621 | 11/1960 | Fernald | 315/8 |
| 3,322,998 | 5/1967 | Norley | 315/8 |
| 3,872,347 | 3/1975 | Matsushima et al. | 315/8 |
| 4,024,427 | 5/1977 | Belhomme | 361/150 X |

FOREIGN PATENT DOCUMENTS

| | | | |
|---|---|---|---|
| 51-62723 | 5/1976 | Japan | 315/8 |
| 51-41455 | 11/1976 | Japan | 315/8 |
| 1129167 | 10/1968 | United Kingdom | 315/8 |
| 1171138 | 11/1969 | United Kingdom | 315/8 |
| 1308220 | 2/1973 | United Kingdom | |
| 1338244 | 11/1973 | United Kingdom | 315/8 |
| 1480635 | 7/1977 | United Kingdom | 315/8 |

OTHER PUBLICATIONS

*Hitachi Colour Picture Tube Application Technical Data*, No. 74D-887 Oct. 20, 1978 p. 1.
Hiraiwa et al., *Degaussing Coil for In-Line Gun Type Color Picture Tube.*
Angaforov, *Terminals of Colour Television Receivers*, Svjaz Publishing House, Moscow, 1971 pp. 102–105.

*Primary Examiner*—Eugene La Roche
*Attorney, Agent, or Firm*—Eugene M. Whitacre; Paul J. Rasmussen; William H. Meagher

[57] ABSTRACT

A single degaussing coil for a kinescope has a first portion located along a first side of the base of a generally pyramidal kinescope envelope or bulb. Second and third portions of the coil extend along portions of second and third sides of the base, and are joined by a fourth portion of the coil lying between the juncture of the neck and the bulb.

5 Claims, 9 Drawing Figures

TILTED UNITARY DEGAUSSING COIL ARRANGEMENT

This is a continuation of application Ser. No. 12,810, filed Feb. 16, 1979, abandoned.

BACKGROUND OF THE INVENTION

This invention relates to an arrangement for degaussing color picture tubes having magnetic shields by use of a unitary degaussing coil in a tilted or skewed position.

Color television displays are often accomplished by means of shadow-mask picture tubes. In such tubes, a plurality of electron beams are directed from slightly different points of origin towards a screen coated with fluorescent phosphors. The phosphors are grouped in triads or groups of three, each member of which fluoresces in a different primary color when illuminated by an electron beam. Each member of each triad is made responsive to a single one of the plurality of electron beams by means of a shadow-mask. The shadow-mask is a thin conductive shield with a multitude of perforations precisely located with respect to each triad of color phosphors. The shadow-mask ideally allows the phosphor of a particular color to be illuminated only by an electron beam originating at a particular location. Thus, with three electron beams originating in slightly different locations, each of the color phosphors of a trio is pure, i.e., is illuminated by only one electron beam, and gradations of color may be achieved by appropriate control of the source of electrons.

In the past, color television displays were sensitive to the influence of the earth's magnetic field. The magnetic field passing through the kinescope deflects the electron beams away from their intended paths and changes the apparent source of the electron beams arriving at the shadow-mask in a manner dependent upon the orientation of the picture tube relative to the earth's magnetic field, thereby impairing color purity. Early attempts to correct this problem involved the use of field neutralizing coils, as described in U.S. Pat. No. 2,921,226 issued Jan. 12, 1960 to Vasilevskis. In the field neutralization arrangement, a direct current is passed through one or more coils arranged about the kinescope in such a manner as to balance to zero or neutralize the earth's field. This required adjustment by an expert, and required readjustment if the television was moved to a new location.

Another approach to correcting color purity problems resulting from the earth's magnetic field involves the use of magnetic shields. In such an arrangement, a hollow shield in the form of the frustum of a cone surrounds the region through which the electron beam travels before reaching the shadow-mask and screen. The high permeability of the shield diverts extraneous magnetic fields away from the electron beam. It was found, however, that the permeable magnetic shield was capable of becoming magnetized and, when so magnetized, itself perturbed the color purity. Degaussing arrangements were then devised to demagnetize the shield and the shadow-mask. The degaussing is accomplished by passing an alternating current of initially large magnitude through one or more coils arranged about the shadow-mask and magnetic shield as described in U.S. Pat. No. 2,962,621 issued Nov. 29, 1960 to Fernald. The magnitude of the alternating current is then gradually reduced to zero and the magnetization of the shield and shadow-mask is reduced. A coil disposed along the periphery of the shadow-mask as illustrated by Fernald tends to produce a relatively small magnetic field near the center of the shadow-mask and screen. Thus, effective degaussing with such a coil requires currents which may be undesirably large.

In order to increase the magnetic flux through the magnetic shield and through the screen without excessive coil currents, arrangements such as those described by Norley in U.S. Pat. No. 3,322,998 issued May 30, 1967 and by Matsushima et al., in U.S. Pat. No. 3,872,347 issued Mar. 18, 1975 were devised. In the Norley and Matsushima arrangements, a pair of coils are arranged symmetrically on the picture tube, with each coil having a portion lying along the periphery of the shadow-mask and a portion extending towards the neck of the tube. The two-coil arrangements produce a magnetic field the lines of which are transverse to or across the longitudinal axis of the tube. This "cross axial" degaussing field approach using a pair of coils provides effective degaussing. However, the two coils require additional labor for mounting as compared with a single coil, and their interconnection may give rise to incorrect wiring. Furthermore, the two-coil arrangement tends to require a greater length of conductor than the single-coil type, and may respond to the deflection yoke field with currents which perturb color purity.

It is desirable to have a degaussing arrangement using a unitary coil requiring a relatively short conductor length which provides degaussing performance substantially equivalent to that of the two-coil system, combined with the simplicity and short conductor length of the single-coil type.

SUMMARY OF THE INVENTION

A degaussing apparatus for a color television picture tube having a relatively large end enclosing a viewing screen and a relatively small end enclosing an electron gun assembly, the two ends being joined by a frusto-conical section, the apparatus being adapted for energization by alternating current having an initially appreciable magnitude which thereafter diminishes to substantially zero. The apparatus includes a shield of magnetically permeable material adjacent the large tube end and at least a portion of the frusto-conical section. A single coil has a portion extending along a portion of the large tube end and a portion extending towards the small tube end around the frusto-conical tube section.

DESCRIPTION OF THE INVENTION

Figure 1A:
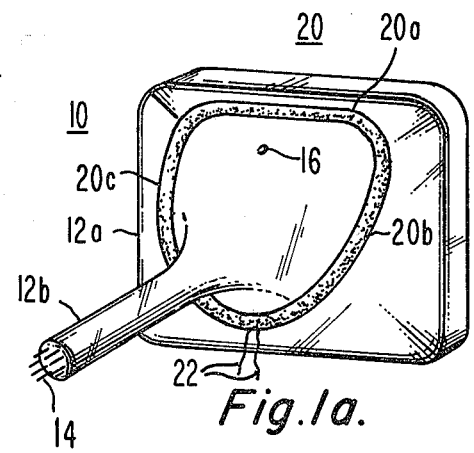
FIGS. 1a and 1b illustrate in perspective views a picture tube with a degaussing arrangement embodying the invention.
Figure 1B:
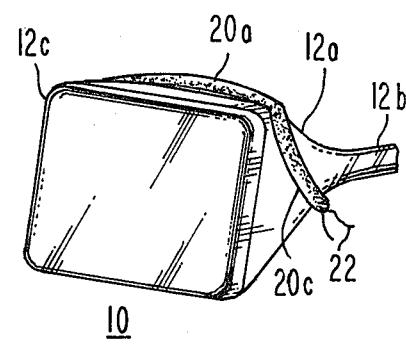

In FIGS. 1a and 1b, a picture tube designated generally as 10 includes an envelope consisting of three distinct portions. A frusto-conical or pyramidal portion 12a of the envelope is joined at the small end of the frusto-conical section with a neck portion 12b of the envelope. A flattened faceplate portion 12c closes the large end of frusto-conical portion 12a. A base 14 at the end of neck section 12b remote from the frusto-conical portion supports pins by which connections are made to the electron gun assembly mounted within neck portion 12b. A high-voltage, anode or ultor connection button 16 is located on the surface of frusto-conical section 12a. A degaussing coil designated generally as 20 is located on the exterior surface of envelope 12. Coil 20 has a generally rounded triangular shape. One leg 20a of coil 20 is adjacent the periphery of the junction of faceplate 12c and frusto-conical section 12a of the envelope. Additional legs 20b and 20c of coil 20 form a vertex extending towards and around the junction of the neck and frustum portions of the envelope. A pair of leads 22 are taken from coil 20 for connection to a source, not shown, by means of which a current of variable amplitude is passed through coil 20 for degaussing.

Figure 2A:
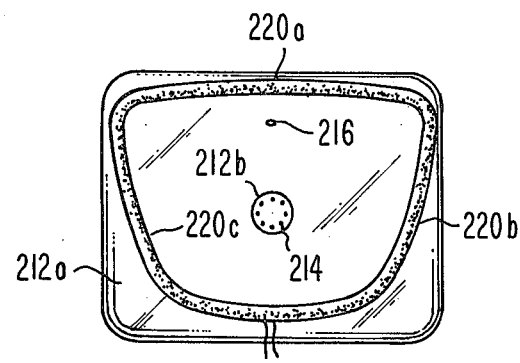
FIGS. 2a and 2b illustrate in respective rear and side views the arrangement of FIGS. 1a and 1b.
Figure 2B:
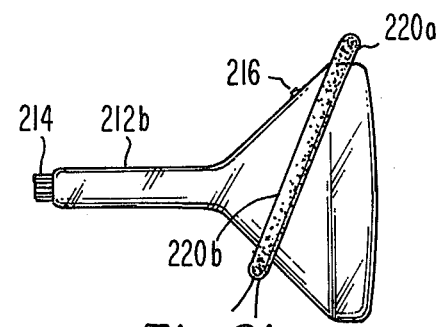

FIGS. 2a and 2b illustrate in respective rear and side views the arrangement of FIGS. 1a and 1b. The rear view of FIG. 2a illustrates the somewhat rectangular outline of the large end of the frusto-conical section which is common in the picture tubes currently in use. The neck portion, however, is circular as seen in this rear view for ease in mounting deflection yokes and other neck components.

Figure 3:
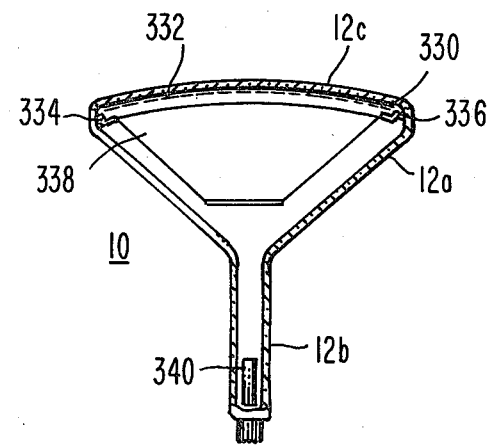
FIG. 3 is a cross-sectional view of the picture tube of the preceding Figures.

The top cross-sectional view of kinescope 10 in FIG. 3 illustrates a phosphor screen 330 adjacent the inside of faceplate 12c of the envelope. A shadow-mask 332 is mounted near phosphor layer 330 by means of mounting brackets 334 and 336. Mounting brackets 334 and 336 also support a hollow magnetic shield 338 formed of a magnetically permeable material. Shield 338 preferably has the general form of frusto-conical portion 12a of the envelope of picture tube 10. Both the large and small ends of shield 338 are open to allow the passage of one or more electron beams from an electron gun assembly 340 mounted within neck portion 12b to phosphor layer 330.

Figure 4A:
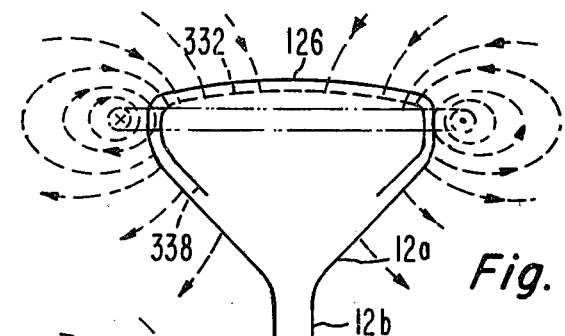
FIG. 4b illustrates magnetic field distributions associated with the invention and FIGS. 4a and 4c illustrate magnetic field distributions associated with the prior art.

The direction of magnetic field distribution generated by a degaussing coil mounted concentric with the picture tube is illustrated in cross-sectional view in FIG. 4a. In a test of such an arrangement, the magnitude of the field available for degaussing at the center of screen 332 was 0.2 gauss with a coil producing a maximum of 20 gauss. The coil also produced between 0.3 and 0.6 gauss at the periphery of the opening at the small or entrance end of magnetic shield 338.

Figure 4B:
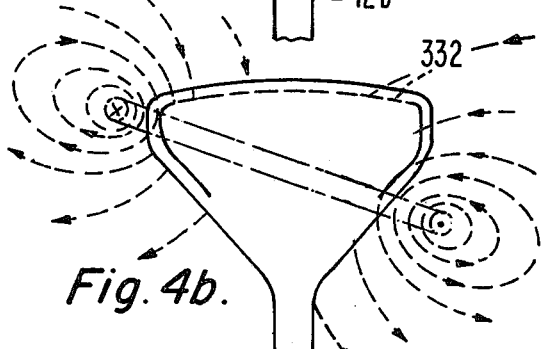

By contrast, the inventive arrangement has as its core more of magnetic shield 338, and produces a magnetic field distribution somewhat as shown in FIG. 4b. The center of the screen is at a region of greater field strength. Using a degaussing coil producing the same maximum field strength as that of FIG. 4a, the degaussing field at the center of the screen was 0.5 gauss, which is almost double that of the prior art arrangement. The corresponding field strengths at the entrance end of magnetic shield 338 were 7.5 gauss at the side nearest the coil, 1 gauss at the side farthest from the coil and 4 gauss at the other two sides. Thus, the fields available for degaussing the magnetic shield are much greater in the inventive arrangement than in the arrangement of FIG. 4a when the coils have the same number of ampere-turns.

Figure 4C:
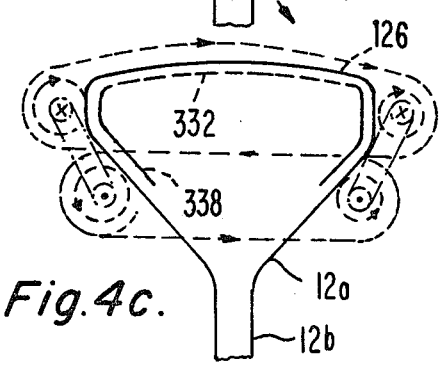

FIG. 4c illustrates the magnetic field distribution associated with two-coil arrangement such as those of Norley and Matsushima. In the arrangement of FIG. 4c, the combined effect of the pair of coils causes a substantial magnetic field flux transverse to the axis of the picture tube in the region of magnetic shield 338. At the faceplate and shadow-mask end of the tube, the magnetic field lines are parallel with the shadow-mask and tend to have a uniform strength through the center of the shadow-mask. The degaussing provided by the inventive arrangement is substantially equivalent to that provided by the two-coil arrangement of FIG. 4c in that it provides degaussing for the internal magnetic shield as well as for the mask and frame assembly. The inventive degaussing arrangement is less costly by virtue of requiring less conductor length than either the single-coil arrangement of FIG. 4a or the two-coil arrangements. The inventive arrangement is easier to assemble than the two-coil arrangements and cannot be wired incorrectly.

Figure 5:
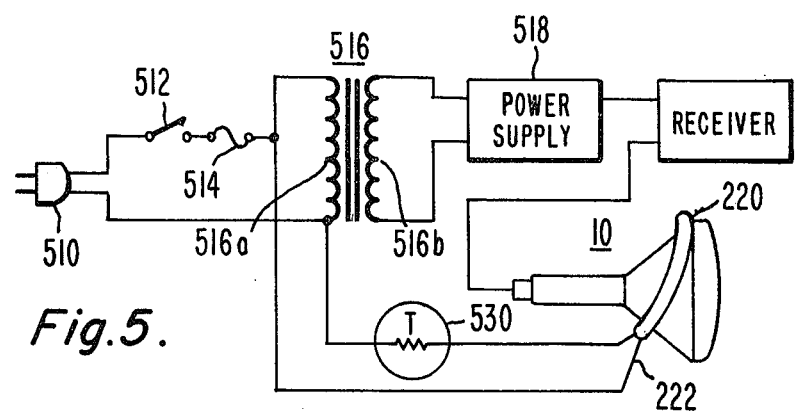
FIG. 5 is a semipictorial diagram containing block, schematic and pictorial portions depicting the arrangement of the invention as used with a television receiver.

FIG. 5 illustrates a circuit by which the degaussing coil may be energized with an alternating current having an initially large amplitude which decreases to a substantially zero amplitude. In FIG. 5, a portion of a television receiver includes a plug 510 adapted to be connected to the alternating power mains. A switch 512 and fuse 514 couple the mains across primary winding 516a of a power transformer 516. A secondary winding 516b of transformer 516 produces alternating current which is utilized by a power supply illustrated as a block 518 for energizing the remainder of the television receiver, illustrated as a block 520. The alternating-current mains are also coupled through a thermally-response resistor 530 to leads 222 of coil 220. Thermally-responsive resistor 530 has a positive temperature characteristic, so that the resistance of the thermistor is low at room temperature and increases with increasing temperature.

At room temperature, the resistance of thermistor 530 is low. When switch 512 is closed in order to energize the television receiver, power is applied through transformer 516 to power supply 518 to energize the receiver. At the same time, an alternating voltage is applied across the series combination of thermistor 530 and coil 220. Because the resistance of thermistor 530 is initially low, a relatively large alternating current flows through coil 220. The current flow through thermistor 530 causes the thermistor to heat, and its resistance to rise. The increasing resistance decreases the current flow resulting from the applied voltage and partially compensates for the reduced power dissipated in the thermistor at the decreased current. The temperature of the thermistor continues to rise, resulting in a rapid reduction in the current to a small limiting value as the resistance of the thermistor reaches a maximum. A circuit arrangement using temperature-responsive resistors is described in U.S. Pat. No. 4,024,427 issued to Belhomme on May 17, 1977.

While the arrangement as described uses an internal magnetic shield, those skilled in the art will recognize that the principles of the invention are equally applicable to a kinescope fitted with an external shield.

What is claimed is:

1. A degaussing arrangement for a color television picture tube, said picture tube comprising an envelope comprising a portion in the general form of the frustum of a cone and having large and small ends, a faceplate portion adjacent said large end, and a neck portion coaxial with said frustum and joined to said small end, said picture tube further comprising a shadow-mask enclosed within said envelope adjacent said faceplate portion and an electron gun assembly enclosed within said neck portion of said envelope, said picture tube further comprising a magnetic shield enclosed within said envelope and in the general form of the frustum of a cone and having large and small ends, said shield being adjacent said frustum-shaped portion of said envelope, said degaussing arrangement comprising;

a single degaussing coil encircling said frustum-shaped portion of said envelope, with the axis of said degaussing coil tilted relative to the axis of said frustum-shaped envelope portion in such manner as to dispose a first segment of the circumference of said coil in a position overlying a region of said envelope adjacent a portion of the periphery of said shadow-mask, and as to dispose a second segment of the circumference of said coil, diametrically opposed to said first segment, in a position which is contiguous with a region of said envelope adjacent said small end of said shield and which is located more remotely from said axis of said frustum-shaped envelope portion than is the adjoining periphery of the opening at said small end of said shield; and means for supplying a variable alternating current solely to said single degaussing coil to effect degaussing of said shadow-mask and said magnetic shield.

2. A degaussing arrangement for a color television picture tube having a longitudinal axis and comprising a magnetic shield in the general shape of a truncated pyramid, a generally rectangular shadow-mask adjacent the large base of said pyramidal shield, and an electron gun assembly, the whole associated with an enclosing envelope comprising a faceplate portion adjacent said mask, a generally pyramidal portion adjacent said shield and a neck portion extending coaxially from the apex of said pyramid for locating said electron gun assembly at a distance from said mask, said degaussing arrangement comprising:

a single degaussing coil encircling said envelope, with the axis of said degaussing coil tilted relative to said longitudinal axis in such manner as to dispose a first segment of the circumference of said coil in a position overlying a region of said envelope adjacent a portion of the periphery of said shadow-mask, and as to dispose a second segment of the circumference of said coil, diametrically opposed to said first segment, in a position which overlies the end of said shield remote from said base and which is located at a distance from said longitudinal axis which is greater than the distance separating the adjoining periphery of the opening at said remote end of said shield from said longitudinal axis; and means for degaussing said shadow-mask and magnetic shield by supplying an alternating current of variable amplitude solely to said single degaussing coil.

3. A degaussing arrangement for a color television picture tube, said picture tube having a longitudinal axis and comprising a magnetic shield in the general form of the frustum of a cone, a shadow-mask adjacent the large end of said frustum-shaped shield, and an electron gun assembly coaxial with said frustum and said shadow-mask, the whole enclosed in an envelope comprising a faceplate portion adjacent said shadow-mask a generally frusto-conical portion surrounding said frustum, and a neck portion joining said frusto-conical portion of said envelope at its small end, said degaussing arrangement comprising:

a single degaussing coil encircling said generally frusto-conical portion of said envelope, with the axis of said degaussing coil tilted relative to said longitudinal axis in such manner as to dispose a first segment of said coil in a position overlying a region of said envelope adjacent the large end of said frustum-shaped shield, and as to dispose a second segment of said coil, diametrically opposed to said first segment, in a position which overlies a region of said envelope adjacent the small end of said frustum-shaped shield and which is located at a distance from said longitudinal axis which is greater than the distance separating the adjoining periphery of the opening at said small end of said shield from said longitudinal axis; and means for degaussing said shadow-mask and said magnetic shield by supplying an alternating current of decaying amplitude solely to said single degaussing coil.

4. A degaussing arrangement for a color television picture tube, said picture tube comprising an envelope comprising a flared portion having large and small ends, a faceplate portion adjacent said large end, and a neck portion coaxial with said flared portion and joined to said small end, said picture tube further comprising a shadow-mask enclosed within said envelope adjacent said faceplate portion and an electron gun assembly enclosed within said neck portion of said envelope, said picture tube further comprising a flared magnetic shield enclosed within said envelope and having large and small ends, said shield being adjacent a segment of said flared portion of said envelope, said degaussing arrangement comprising;

a single degaussing coil encircling said flared portion of said envelope, with the axis of said degaussing coil tilted relative to the axis of said flared envelope portion in such manner as to dispose a first segment of the circumference of said coil in a position overlying a region of said envelope adjacent a portion of said large end of said shield, and as to dispose a second segment of the circumference of said coil, diametrically opposed to said first segment, in a position which is contiguous with a region of said envelope adjacent a portion of said small end of said shield and which is located more remotely from said axis of said flared envelope portion than is the adjoining periphery of the opening at said small end of said shield; and means for supplying a variable alternating current solely to said single degaussing coil to effect degaussing of said shadow-mask and said magnetic shield.

5. A degaussing arrangement in accordance with claim 4 wherein said first coil segment is disposed in a portion overlying a region of said envelope adjacent an upper portion of said large end of said shield, and wherein said second coil segment is disposed in a position contiguous with a region of said envelope adjacent a lower portion of said small end of said shield.

* * * * *